United States Patent [19]
Browning et al.

[11] Patent Number: 4,783,097
[45] Date of Patent: Nov. 8, 1988

[54] DECORATIVE BAR ARRANGEMENT SIMULATING A ROLL BAR FOR INSTALLATION OF PICK-UP TRUCKS AND THE LIKE

[75] Inventors: James R. Browning, Berea; Louis D. Carlo, Valley City, both of Ohio

[73] Assignee: Mr. Gasket Company, Cleveland, Ohio

[21] Appl. No.: 134,986

[22] Filed: Dec. 18, 1987

[51] Int. Cl.$^4$ .............................................. B60R 27/00
[52] U.S. Cl. ..................................... 280/756; D12/156
[58] Field of Search .................... 280/756; 403/83, 84, 403/237; 248/68.1, 352; D12/156

[56] References Cited

U.S. PATENT DOCUMENTS

| Re. 28,876 | 6/1976 | Notestine et al. | 280/756 |
|---|---|---|---|
| D. 245,496 | 8/1977 | Wheeler | D12/156 |
| D. 253,170 | 10/1979 | Ramirez | D12/156 |
| 3,451,715 | 6/1969 | Stuckenberger | 296/102 |
| 4,148,504 | 4/1979 | Rushing | 280/756 |
| 4,171,141 | 10/1979 | Hobrecht | 280/756 |
| 4,202,579 | 5/1980 | Berggren | 296/156 |
| 4,273,465 | 6/1981 | Schoen | 248/68.1 |
| 4,591,287 | 5/1986 | Hughes | 403/237 |

FOREIGN PATENT DOCUMENTS 1125771 8/1968 United Kingdom .................. 403/84

OTHER PUBLICATIONS

Advertisement of Double Roll Bar, p. 100, Mar. 1983 issue of "4–Wheel & Off–Road" magazine.
Article entitled "Chevy Chaser", pp. 86–87, May 1983 issue of "4–Wheel & Off–Road" magazine.
Article entitled "Totally Tubular", pp. 49–51, Feb. 1983 issue of "4–Wheel & Off–Road" magazine.
Article entitled "Flashy Protection", pp. 52–53, Apr. 1978 issue of "4–Wheel & Off–Road" magazine.
Misc. pages (numbered 1–18) from "4–Wheel & Off-Road" magazine showing various advertisements relating to decorative roll bars.
Selected pages of brochure from "Hickey Off-Road Products" showing various decorative roll bar arrangements & styles—copyright 1985.

Primary Examiner—Ross Weaver
Attorney, Agent, or Firm—Body, Vickers & Daniels

[57] ABSTRACT

A decorative bar arrangement for attachment to the bed of a pick-up truck or like vehicle to resemble a professionally installed roll bar is disclosed. The decorative bar arrangement includes an upright U-shaped tubular assembly having a bight portion with vertically extending leg portions depending therefrom and a kicker U-shaped tubular assembly having a bight portion with angled leg portions depending therefrom. A hinge-fastening clamp is provided for positively securing, in a pinned manner and without deformation, the bight portions of the upright and kicker assemblies while permitting, prior to fastening, rotation of the leg portions of the kicker assembly into their desired positions. Additionally, a locking, universal swivel end clamp is provided for securing the kicker leg portions to the pick-up truck bed, and a telescoping clamp permits portions of the U-shaped tubular assembly to be dimensionally adjustable.

49 Claims, 8 Drawing Sheets

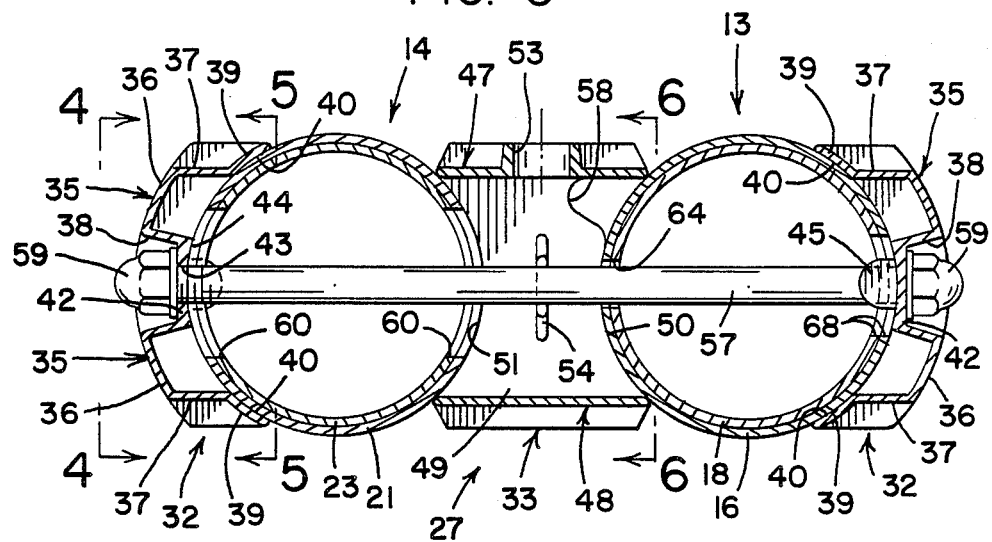
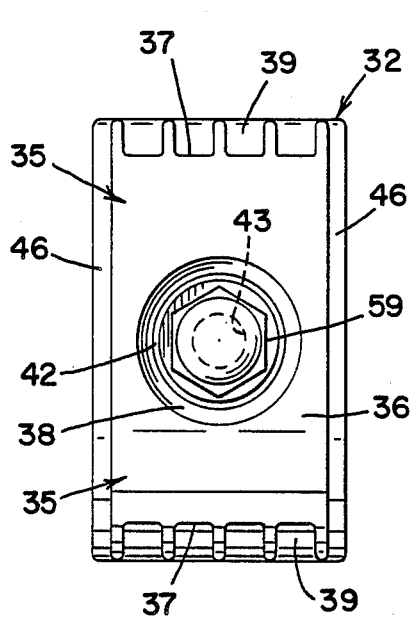
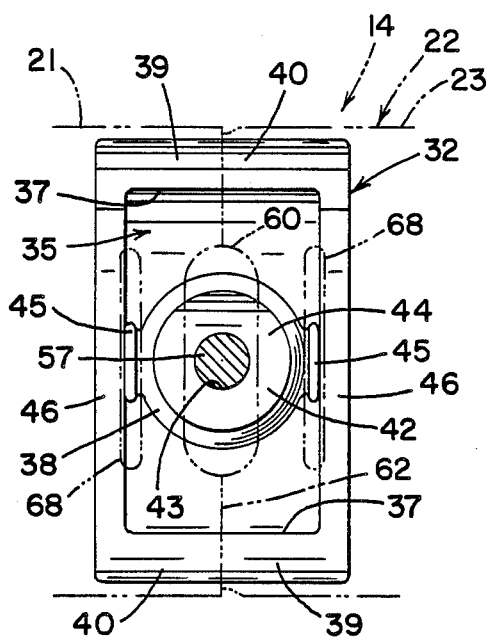
FIG. 3
FIG. 4
FIG. 5

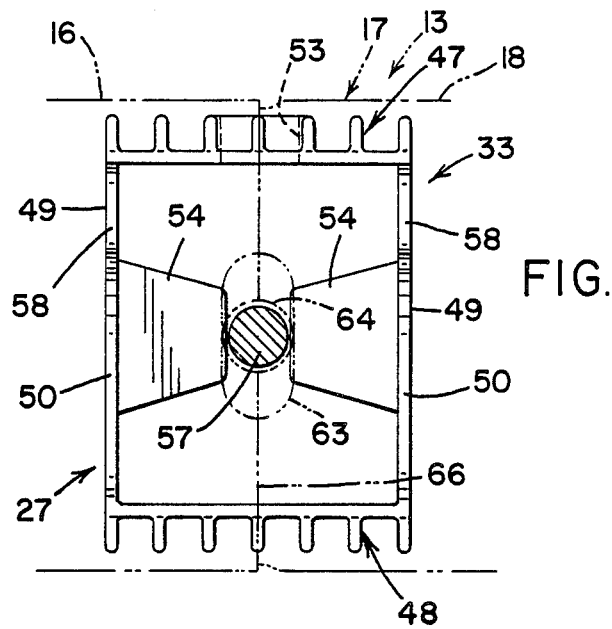
FIG. 6
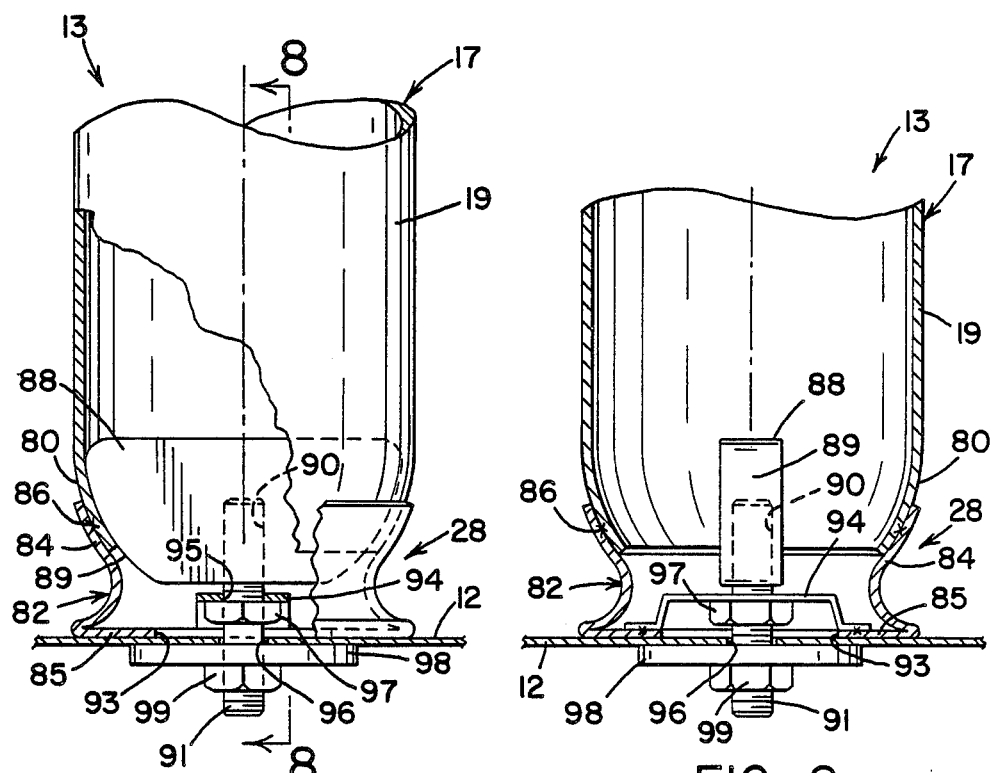
FIG. 7
FIG. 8

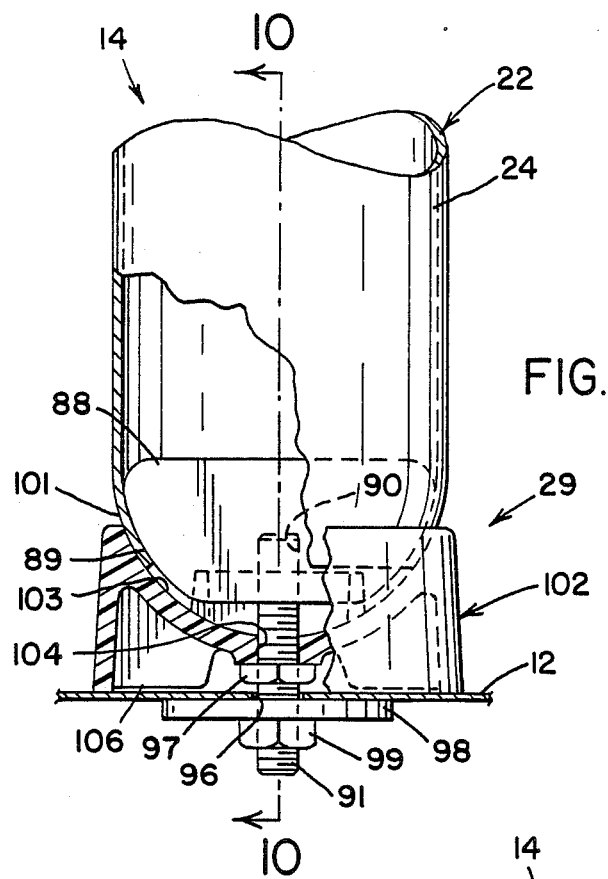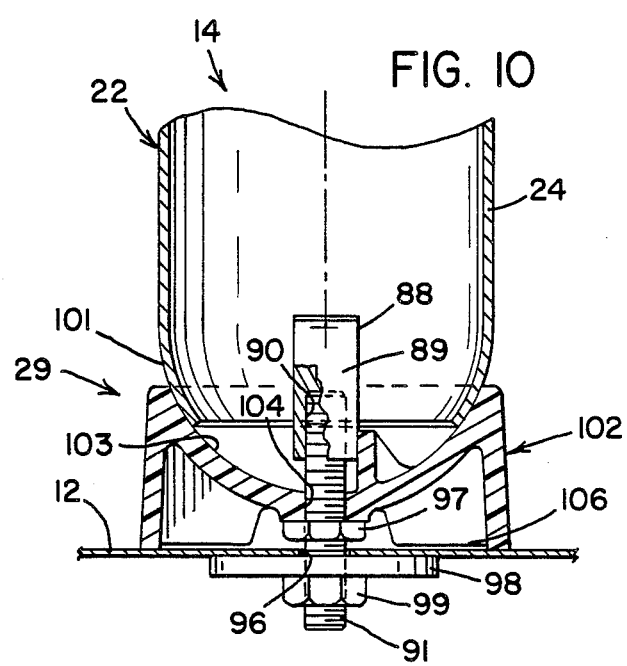

DECORATIVE BAR ARRANGEMENT SIMULATING A ROLL BAR FOR INSTALLATION OF PICK-UP TRUCKS AND THE LIKE

This invention relates generally to a decorative bar arrangement which simulates a roll bar arrangement and more particularly to the connectors used for assembling and mounting a decorative bar arrangement onto the bed of a pick-up truck or like vehicle.

The invention is particularly applicable to a decorative bar arrangement of the type where an upright U-shaped bar is joined to a kicker U-shaped bar angled in relationship thereto and will be described with particular reference thereto. However, the invention may have broader application and can be applied to any arrangement where one tubular member must be securely fastened to another tubular member after it has been rotated into a desired angular relationship thereto.

INCORPORATION BY REFERENCE

Incorporated by reference herein is U.S. Pat. No. 4,148,504 which issued Apr. 10, 1979 to J. D. Rushing and U.S. Pat. No. Des. 257,673 which issued Dec. 23, 1980 to Milton and two advertisements, undated, which illustrate simulated roll bar arrangements similar to that disclosed herein. Also incorporated by reference is U.S. Pat. No. 3,561,816 to Koch which issued Feb. 9, 1971 and which illustrates a particular type of a swivel joint and U.S. Pat. No. 4,660,345 to Browning and assigned to the current assignee which issued Apr. 28, 1987 and illustrates various connector designs employed in assembling a vehicular tubular space frame.

BACKGROUND OF THE INVENTION

During the past several years, a market has arisen where consumer end users or specialty jobbers install decorative bar arrangements onto the bed of pick-up trucks and like vehicles to simulate a professionally installed roll bar. The bar arrangement is decorative since such bars may not afford reliable protection to the occupants of the vehicle should the vehicle be subjected to severe impact forces in a crash and roll over. This is especially true since the bars are often installed by non-professionals for mere appearance sake. Nevertheless, a significant consumer market exists for such bar arrangements if constructed in an aesthetically pleasing arrangement with the tubular members either coated with a black finish, stainless steel or brightly chromed. The bar arrangement typically carries a light bar track with spotlights mounted on the top thereof and extending above the cap of the truck.

Of the various types of decorative bar arrangements in use, one which has found particular consumer acceptance comprises an upstanding U-shaped member secured at its legs to the truck bed. A second angled or kicker U-shaped member with its legs secured to the truck's wheel wells is then positioned relative to the upstanding U-shaped member so that the bight portions of both members are at the same elevation and are parallel to one another in spaced relationship. Spacers are provided to maintain the spaced, parallel relationship between the bight portions and mounted on the spacers is the track lighting bar typically employed in such decorative bar arrangements. Because the spacers provide a convenient point to install the track lighting with wires hidden from view, the kicker member thus described is preferred over other arrangements which would simply provide angled struts attached to the bight portion of one U-shaped member at one end and to the wheel well of the vehicle at the other end. Prior to the present invention, it was known to make universally useable bar arrangements including two U-shaped members having two parallel, adjustable straight portions across the top (see U.S. Pat. No. 4,148,504) and the U-shaped kicker member being rotatably mounted with respect to the U-shaped upright member to accommodate different mounting surfaces. This prior arrangement did not fixedly lock the two parallel top portions into a permanent, fixed position except by presumed friction or welding, which is unavailable to most end users.

The typical installation of the decorative bar arrangement described comprises positioning the upright U-shaped member against the truck cab and securing the leg ends of the U-shaped member to the truck bed by bolting a rectangular base plate thereto. Spacers are then held between the bight portion of the upright member and the bight portion of the kicker member while the legs of the kicker member are rotated into their rest position against the wheel wells of the truck bed at which point the kicker member is clamped to the upstanding roll bar i.e. for example, by means of a C-clamp. The leg portions of the kicker member are fastened to the wheel wells and the spacers then welded to firmly join the bight portion of the kicker member with the bight portion of the upright member. This procedure is conventionally used in constructing tubular space frames for racing vehicles and the like, and is simply adopted for the decorative bar installation. Welding obviously presents a problem if the consumer, who may not have the access to such equipment, is doing the installation. Importantly, if the welding is not carefully done the finish of the assembly is adversely affected.

While the prior art has made some attempt at providing adjustments to the lengths of the various portions of the U-shaped assemblies to achieve a universal application kit, this has not been done in an aesthetically pleasing manner which gives the appearance of a custom fitted application. Furthermore, the adjustable feature, such as shown in U.S. Pat. No. 4,184,504 is achieved by fitting a pin into one of a plurality of holes which will not permit slight length adjustments that are sometimes critical to a professional installation appearance. While it is possible for the manufacturer of the decorative bars to pre-weld the kicker member to the upright member so that the leg ends can simply be bolted to the truck bed, this is not feasible not only because of packing and shipping costs, but also because of the huge inventory problems that would be created. That is, while each assembly is unique to a particular truck bed, common tubular elements which need only be slightly modified can fit a wide variety of different truck beds. This cannot be realized if the kicker member bar must be pre-welded at a fixed angle relative to the upright member.

SUMMARY OF THE INVENTION

It is thus a principal object of the present invention to provide a decorative bar arrangement to simulate a roll bar for application to the bed of a pick-up truck or like vehicle which overcomes the aforementioned problems present in current decorative bar arrangements as described above. Such an arrangement uses the two U-shaped member concept and provides positive (non-friction) locking without use of welding. Only in this manner can the bar arrangement be mass marketable and still rigid in the final assembled position.

This principal object along with other features of the subject invention is achieved in a decorative bar arrangement to be installed on the bed of a pick-up truck or like vehicle of the type which comprises a first generally upright, U-shaped tubular assembly having a bight portion positioned generally behind and in line with the roof of the cab of the vehicle and first and second generally parallel and vertically upstanding leg portions adapted to be secured to the bed of the pick-up truck. The decorative bar arrangement also includes a second generally U-shaped tubular assembly having a bight portion with first and second generally parallel leg portions adapted to be secured to the bed of the pick-up truck and when secured to extend at an angular relationship relative to the first and second leg portions of the first tubular assembly. A hinge-fastener arrangement is then provided for securing the first tubular assembly to the second tubular assembly which includes a pin mechanism extending through the bight portions of both members for securely locking the bight portions together in a spaced, parallel, fixed relationship. The fastener also permits rotation of the bight portion of the second tubular assembly relative to the first tubular assembly so that the leg portions of the second tubular assembly can be placed in their proper angular relationship relative to the truck bed. The hinge-fastener mechanism thus eliminates the necessity of a welded connection in favor of a mechanical connection as strong as a welded connection while permitting the decorative bar asssembly to be easily assembled by the end user.

In accordance with another more specific feature of the invention, the tubular assemblies comprise decoratively coated thin walled pipe or tubing and the hinge-fastener mechanism includes at least one clamp assembly comprising a pair of end clamps and a spacing middle clamp. Each end clamp has a recessed opening and an arcuate surface extending from diametrically opposite sides of the recessed opening with the arcuate surface of one clamp configured to closely resemble the cylindrical shape of the first decorative bar pipe and the arcuate surface of the other clamp configured to closely resemble the cylindrical surface of the second decorative bar pipe. The middle clamp essentially comprises oppositely opening first and second arcuate bearing surfaces spaced from one another a predetermined distance with the first arcuate surface configured similar to the cylindrical surface of the first decorative bar pipe and the second arcuate surface configured similar to the cylindrical surface of the second decorative bar pipe. The pin mechanism includes a threaded rod extending through and in threaded engagement with one recessed opening in one of the end clamps and extending at least into an in threaded engagement with the recessed opening of the other clamp with the spacer clamp between the first and second decorative bar pipes such that when the assembly is tightened the arcuate surface distributes the tightening force about cylindrical surface areas of the decorative bar pipes remote from the threaded rod thus minimizing distortion or deformation of the decorative bar pipe members.

In accordance with a yet more specific feature of the invention, the bight portion of each tubular member is a cross-over pipe, and the leg portions are leg pipes bent at one end and reduced in diameter to fit within the associated cross-over member or visa versa so as to provide a wide variety of kits with the least amount of elements. The bent ends of the leg pipes and the ends of the cross-over pipes for the second decorative bar are circumferentially slotted at diametrically opposite positions with each slot having a width slightly wider than the diameter of the threaded rod. The bent ends and cross-over ends of the first decorative bar have a rod opening adjacent the second decorative bar through which said threaded rod extends and a circumferentially extending slot positioned diametrically opposite the rod opening thus permitting relative decorative bar rotation while the ends of the leg pipes of the kicker decorative bar are positioned on the wheel wells of the truck bed, and at the same time providing a double wall connection further resisting any tendency of pipe deformation from the bolt tightening forces. Importantly, the rigidity of the joint is further enhanced by a tubular sleeve brace which fits over each joint. The brace is slitted longitudinally therealong so that it can be spread open and tightly engage the outside diameter of the bent leg ends and across the ends of the cross-over pipe while appropriately slotted to permit a multiple wall joint connection. A rigid, non-deformable double or triple wall joint thus results and permits the wall thickness of the decorative bar tubing to be reduced or minimized which significantly affects the cost of the decorative bar arrangement.

In accordance with a still more specific feature of the invention, the end clamps may be provided with a radially-inwardly extending tabs or projections on diametrically opposite sides of the recessed center opening which engage similarly formed, radially extending slits in the ends of the mating pipe members to assure axial alignment of the cross-over pipe with respect to the bent ends of the leg pipes.

Another important feature of the invention resides in the anchoring arrangement used to universally mount the bed ends of the leg pipes to the wheel wells or the truck bed for the kicker decorative bar. The bed ends of the leg pipes are crimped to form a spherical end. The outer surface of the spherical end can then universally pivot within the spherical contour of a hollow anchor casting. Positioned within the bed end of the leg pipe is a locking anchor member having a blind threaded bore opening to the open bed end. The edge surface of the anchor lock member is spherically formed and seated against the inside surface of the spherically formed bed end so that the bed end is firmly grasped between the anchor locking member and the anchor retaining casting. A threaded retaining fastener extending from the underside of the truck bed or wheel well engages the blind threaded bore to lock the bed end of the leg pipe to the truck bed. Preferably a lock or jam nut along with an appropriate access recess in the anchor casting is provided to prevent loosening of the threaded retaining fastener. A large washer plate member is also provided on the underside of the truck bed and engaged by the retaining fastener to prevent not only distortion of the wheel well or the truck bed, but also to distribute the tightening forces about the base of the anchor casting. By initially permitting universal swivelling action in a lockable end joint, the modulability aspects of the kicker leg pipe is significantly enhanced.

Still another feature of the invention is to provide for at least the leg portions of the tubular U-shaped assemblies to be infinitely adjustable over a limited, adjustment dimension by using two adjustable tubular members which, when assembled together make up each leg portion. One adjustable member is slotted for movement relative to the second member which overlies the adjustable slotted member and has two diametrically opposite circular openings therethrough. A friction clamp overlies or circumscribes the second adjustable member with similar diametrically opposite circular openings therethrough. A threaded fastener extending through the openings in the clamp, the second adjustable member and the slot in the slotted member permits, when loosened, the length of the slotted member to be adjusted relative to the second member and when tightened, a frictional force between the friction clamp and the first and second adjustable tubular members to prevent relative or axial movement therebetween. In one friction clamp arrangement where the slotted adjustable tubular member has the slot in the necked down portion of the pipe received within the end of the second adjustable pipe, a plastic cover and guard is inserted under the base of the clamp to maintain an aesthetic connection while distributing the frictional force applied by the clamp to the adjustable pipes.

It is thus another object of the invention to provide in a two decorative bar arrangement a non-welded connector for the bight portions of the decorative bar which permits initial rotation of one of the bars relative to the other before providing a positive, non-yielding, non-friction derived connection therebetween.

It is another object of the invention to provide in a simulated, two-U-shaped decorative bar arrangement, a connector for the bight portions of the decorative bars which does not deform the decorative bar when applied thereto.

It is yet another object of the invention to provide in a simulated, decorative decorative bar arrangement using leg portions or members secured to an upright U-shaped member a swiveling attachment which rigidly locks the leg portion in proper angular position.

Yet another object of the invention is to provide a kit for constructing a decorative bar arrangement comprising two U-shaped assembled members and connectors which can be applied to a wide variety of pick-up truck beds and like vehicles with the manufacture of only a limited number of component parts.

Yet another object of the invention is to provide a decorative bar arrangement in a kit form which uses minimum thickness, thin wall tubing for the decorative bars which do not deform when clamped by the connectors thus resulting in a less expensive decorative bar arrangement.

Still another object of the invention is to provide a swivel connector for the kicker decorative bar of a decorative bar arrangement which allows one length of kicker leg pipe to be used for a variety of truck bed sizes.

Yet another object of the invention is to provide a decorative bar arrangement which simulates a roll bar and is comprised of thin walled tubing assemblies which are infinitely adjustable in length to permit a professional installation.

Yet another object of the invention is to provide a simple and economical decorative bar arrangement for installation on the beds of pick-up trucks and like vehicles.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 3 is a schematic, section view of the clamp shown in FIG. 2 taken along lines 3—3 of FIG. 2;

FIGS. 4, 5 and 6 are section views of the clamp shown in FIG. 3 taken respectively along lines 4—4, 5—5 and 6—6 of FIG. 3;

FIG. 7 is a schematic, partially sectioned, elevation view of a clamp for the bed end of the upright decorative bar taken along lines 7—7 of FIG. 1;

FIG. 8 is a section elevation view of the clamp shown in FIG. 7 taken along lines 8—8 of FIG. 7;

FIG. 9 is an elevation, partially sectioned view of a clamp for the bed end of the kicker decorative bar taken along lines 9—9 of FIG. 1;

FIG. 10 is an elevation, section view of the clamp shown in FIG. 9 taken along lines 10—10 of FIG. 9;

DETAILED DESCRIPTION OF THE PREFERRED EMBODIMENT

Figure 1:
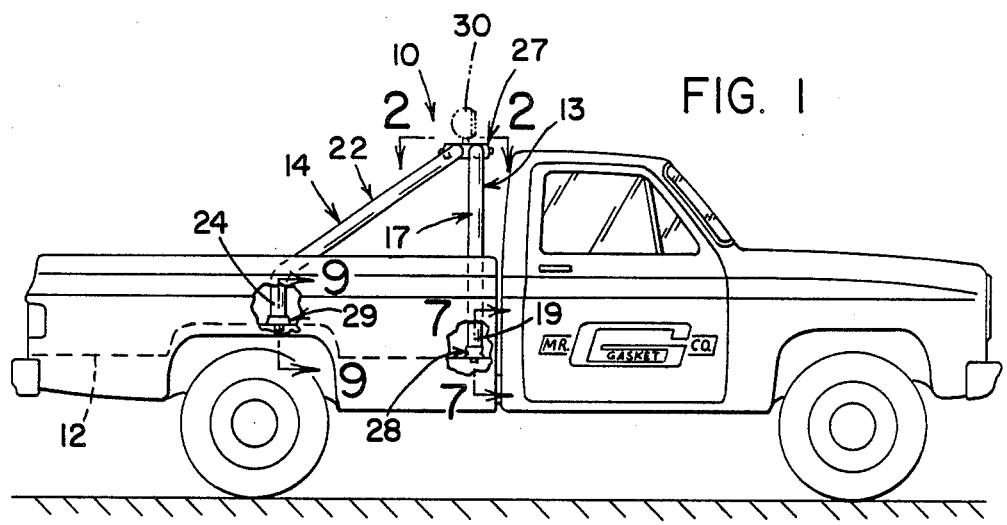
FIG. 1 is a pictorial view showing a decorative bar applied to the bed of a pick-up truck.

Referring now to the drawings wherein the showings are for the purpose of illustrating preferred and alternative embodiments of the invention and not necessarily for limiting the same, FIG. 1 shows generally a tubular decorative bar arrangement 10 applied to the floor or bed 12 of a pick-up truck or like vehicle. The particular decorative bar arrangement 10 illustrated is of the type which comprises a first or upright U-shaped tubular assembly 13 having a bight portion generally parallel and aligned with the roof of the cab of the vehicle and leg portions depending from the ends of the bight portion secured, in turn, at their free ends to bed 12. A second or kicker U-shaped tubular assembly 14 also has a bight portion and leg portions extending from the ends of the bight portion, but the leg portions of second tubular assembly 14 are angled with respect to the leg portions of first tubular assembly 13 so that the bight portion of second U-shaped tubular assembly 14 is kicked or brought into parallel spaced alignment with the bight portion of the first U-shaped tubular assembly 13. The free ends of the leg portions of kicker tubular assembly 14 are secured generally to the wheel well portions of bed 12.

In practice and in order to supply decorative bar arrangement 10 in kit form, first and second U-shaped tubular assemblies 13, 14 are made up of various lengths of stainless steel tubing or thin walled pipes, typically a 409 grade of stainless with an O.D. of about 3 inches and a wall thickness of 0.05–0.06 inches and preferably 0.055 inches. As used herein, the terms "tubing" and "pipe" are interchangeable. The point is that the structural members are sturdy but thin walled tubular elements to minimize the cost of a decorative bar arrangement kit, and in accordance with the teachings of the invention, provisions are made in the arrangement of the tubing and the connectors to rigidize and strengthen the tubular member so that the wall thickness can be minimized. As noted above, the pipe sections are either supplied with a bright chrome finish or as stainless steel, or with a black, matted anodized finish for aesthetic purposes.

For definitional purposes first U-shaped tubular assembly 13 comprises a cross-over pipe 16 which represents the bight portion of the U-shaped member and a pair of upright leg pipes 17 representing the leg portions of first U-shaped tubular member. Each upright leg pipe 17 has a bent end 18 adapted to mate with an associated end of cross-over pipe 16 and a bed end 19 adapted to be secured to bed 12 of the vehicle. Similarly kicker U-shaped tubular assembly 14 includes a cross-over pipe 21 and a pair of kicker leg pipes 22, with each kicker leg pipe 22 having a bent end 23 adapted to mate with cross-over pipe 21 and a bed end 24 adapted to be mounted to bed 12 of the vehicle. Each bed end 24 of kicker leg pipes 22 is shown in FIG. 1 as bent for aesthetic reasons. However, it is to be understood that kicker leg pipes 22 could be straight. It is also to be understood that upright leg pipes 17 and kicker leg pipes 22 could be bent so as to be within bed 12 where they are attached but outside the bed once they extend beyond the bed rail.

Completing the listing of the components for the kit for a decorative bar arrangement 10 are a pair of cross-over clamp assemblies 27 (FIG. 2), a pair of upright leg clamp assemblies 28 (FIG. 7) and a pair of kicker leg clamp assemblies 29 (FIG. 9). One function of decorative bar arrangement 10 is to hold a light bar track carrying spot lights or flood lights shown in phantom line at 30 which preferably is mounted to cross-over clamp assembly 27 (FIG. 1). The light bar is typically not supplied with the decorative bar kit.

Referring now to FIGS. 2–6, cross-over clamp assembly 27 includes a pair of identical (because the pipe O.D. is the same for both tubular assemblies 13, 14) end clamps 32 and a center spacing clamp 33. All clamps 32, 33 are preferably stainless steel castings. Each end clamp 32 engages the outside surface of one of the cross-over pipes 16, 21 over surface portions remote from one another while center spacing clamp 33 engages the outside surface of both cross-over pipes 16, 21 at portions adjacent one another.

Cross-over clamp assembly 27 will be first described with reference to its positive locking features. End clamp 32 has a pair of longitudinally extending ribs 35 with each rib in turn having an outer wall 36, a radially inwardly extending outer side wall 37 extending from one end of outer wall 36 and a radially inwardly extending inner side wall 38 depending from the opposite end of outer wall 36. Outer side wall 37 ends in an arcuate shaped bearing wall 39 which in turn has an inner arcuate bearing surface 40 configured to bear against the O.D. of cross-over pipes 16, 21 and bent end 18, 22 of upright leg pipe 17 and kicker leg pipe 22 respectively. The radially extending inner side wall 38 terminates in a recessed annular boss wall 42 having a central rod opening 43 formed therein. Boss wall 42 also has an inner boss arcuate surface 44 adapted to engage the cylindrical outside surface of tubular assemblies 13, 14. Also arcuately configured side runner 46 (FIGS. 4, 15) are provided for additional bearing surfaces. Optionally provided at diametrically opposite portions of boss wall 42 are radially inwardly projecting tabs 45 (FIGS. 3 and 5) for purposes which will be hereafter explained.

Center clamp 33, as best shown in FIGS. 3 and 6, has a ribbed top wall 47, a ribbed bottom wall 48 and two longitudinally spaced arcuate side walls 49. One side wall 49 is positioned to engage the bent ends 18, 23 of leg pipes 17, 22 respectively while the other side wall 49 is positioned to engage cross-over pipes 16, 21. Arcuate side walls 49 are defined by forward and rearward arcuate edge surfaces 50, 51 which are concave in diametrically opposite directions so that forward arcuate edge surface 50 engages first tubular assembly 13 while rearward arcuate edge surface 51 engages kicker tubular assembly 14. A mounting opening 53 through ribbed top wall 47 is provided for the spotlight track 30 and confronting longitudinally extending tabs 54 extending from arcuate side walls 49 may be optionally provided as a guide for a threaded rod or pin 57. Additionally, a recess 58 may be provided (FIGS. 3, 15) in side walls 49 for stringing, in a hidden manner, wiring for the spotlight track 30.

As noted, cross-over clamp assembly 27 is positioned with one end clamp 32 on one side of first tubular assembly 13 and the other end clamp 32 on the other side of second tubular assembly 14 with center spacing clamp 33 therebetween as shown in FIG. 3 and the assembly is held together by a threaded rod 57 passing through cross-over clamp assembly 27 and through suitable openings provided in first and second tubular assemblies 13, 14. Cross-over clamp assembly 27 is then securely fastened to pin first and second tubular members 13, 14 together by means of decorative threaded end caps 59 positioned within end clamps 32 so as not to significantly extend beyond outer ribbed wall 36. A threaded bolt or other conventional pin-fastener arrangements can be used in place of threaded rod 57. When cross-over clamp assembly 27 is tightened, however, the tightening forces are transmitted to the first and second tubular assemblies 13, 14 through inner arcuate bearing surfaces 40 and arcuate boss bearing surface 44 vis-a-vis end clamps 33 and through forward and rearward arcuate edge surfaces 50, 51 vis-a-vis center clamp 33 which so distributes the load about the O.D. portion of first and second tubular assemblies 13, 14 to avoid distortion or deformation of the pipes, which as noted, are thin walled. Hence, a high tightening force can be applied to clamp first and second tubular assemblies 13, 14 together in a fashion equivalent to a welded joint while the force developed by cross-over clamp assembly 27 is distributed about an outside peripheral portion of the pipes to avoid crushing or deformation of the pipes.

Figure 2:
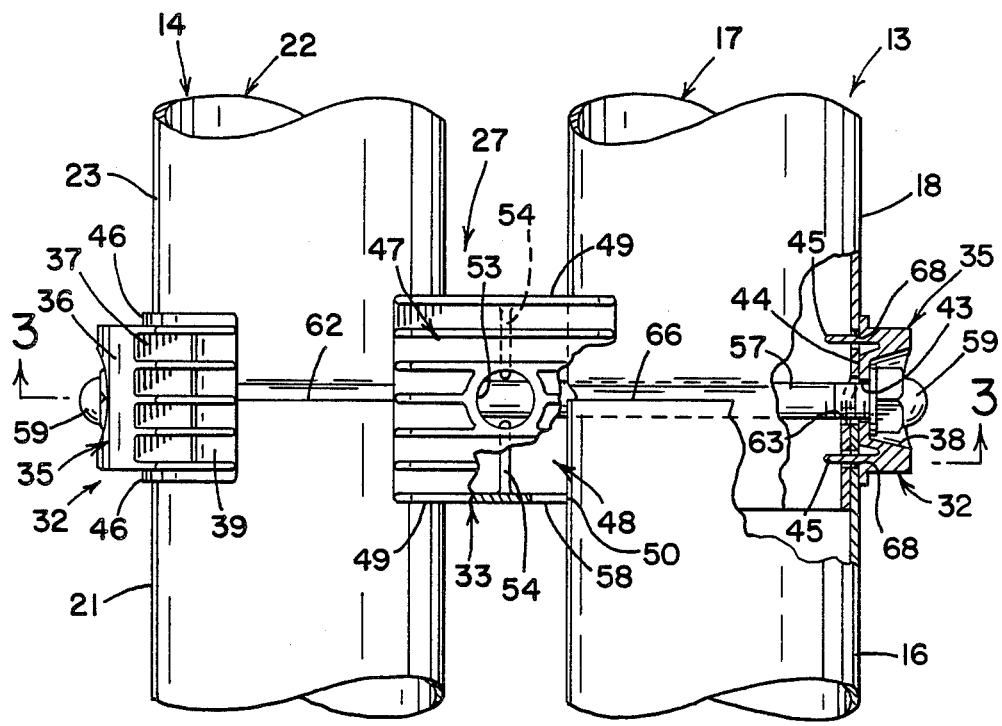
FIG. 2 is a top, schematic plan view of one of the clamp arrangements taken along lines 2—2 of FIG. 1.

The hinge or swivelling aspects of cross-over clamp assembly 27 will now be described with reference to FIGS. 2–6 where the embodiment discloses necked down bent end 18 of upright leg pipe 17 fitting within the unreduced end of cross-over pipe 16 and similarly necked down bent end 23 of kicker leg pipe 22 fitting within the unreduced end of kicker cross-over pipe 21. Alternatively, the ends of cross-over pipe 16, 21 could be necked down and fitted within the unreduced inside diameters of bent ends 18, 23. Referring now specifically to FIGS. 2 and 3 and the second U-shaped tubular assembly 14, bent end 23 of kicker leg pipe 22 has diametrically opposed circumferentially extending slots 60 (shown in phantom line in FIG. 5) which has a longitudinally extending width in slight excess of the diameter for threaded rod 57. The slot extends a circumferential distance sufficient to permit threaded rod 57 to rotate through an included angle of about 60° from the top to the bottom of slot 60 or, alternatively stated, through an angle of about 30° when rod 57 is positioned in the center of slot 60. The outer edge 62 of kicker cross-over pipe 21 is indented to form in effect a half slot which when assembled, overlies circumferentially extending slots 60 in kicker leg bent end 23. This provides, as best shown in FIG. 2, a double pipe joint for at least a portion of the pipe joint assembly grasped by cross-over clamp assembly 27. Bent end 18 of upright leg pipe 17 is similarly neck down to fit within upright cross-over pipe 16 and has a circumferentially extending slot 63 similar to circumferentially extending slot 60 extending about a circumferential portion of kicker bent end 23 which is remote from second U-shaped tubular assembly 14. The width of circumferentially extending slot 63 is approximately that of kicker circumferentially extending slot 60 but the length is reduced to encompass only an included angle of about 30° permitting rotation of threaded rod 57 approximately 15° on either side of its center line. Diametrically opposite the center of circumferentially extending slot 63 is a circular pivot opening 64 of diameter slightly greater than that of rod 57. The outer edge 66 of cross-over pipe 16 is formed with a pair of diametrically opposed indentations one of which forms one-half of circumferentially extending slot 63 and the other of which forms approximately one-half of circular pivot opening 64 and is similar to the indentations formed in the outer edge of kicker cross-over pipe 62 with respect to those indentations similarly overlying circumferentially extending slot 60. When decorative bar arrangement 10 is applied to bed 12, upright bent ends 18 are inserted into upright cross-over pipe 16 and upright bed ends 19 secured to bed 12. Kicker bent ends 23 are then inserted within kicker cross-over pipe 21 and kicker cross-over pipe 21 is clamped to upper cross-over pipe 16 vis-a-vis cross-over clamp assembly 27. More specifically, end clamp 32 is positioned adjacent circumferentially extending slot 63 and rod 57 inserted through slot 63 opening 64, past longitudinal tabs 54 of spacer center clamp 33 and thence through slot 60 in the second tubular assembly 14 through central opening 43 in the other end clamp 32 and decorative nuts 58 lightly tightened to rod 57. The kicker leg pipes 22 are then angled into proper position relative to bed 12 and anchored thereto which causes a rotation of kicker pipe bent end 23 relative to kicker cross-over pipe 21 or rotation of kicker pipe bent end 23 and kicker cross-over pipe 21 relative to upright bent ends 18 and cross-over pipe 16. In addition, to maintain the cross-over portions of first and second tubular assemblies 13, 14 parallel with one another, the attitude of threaded rod 57 relative to its position with respect to leg pipe bent ends 18, 23 and cross-over pipes 16, 21 may cause some pivoting about circular pivot opening 64 and movement of the ends of rod 57 in circumferentially extending slot 60, 63. Irrespective of such relative movement the position of arcuate bearing surfaces 40 of end clamp 32 are such to assure full bearing along the outer cylindrical surfaces of both leg bent ends 17, 23 and the ends of cross-over pipe 16, 21.

Also, for the particular embodiment illustrated in FIGS. 2-6, thin circumferentially extending aligning slots 68 are formed in bent ends 18, 23 and at least one aligned slot 68 is formed in cross-over pipes 16, 27. The tolerance between tabs 45 and the width of aligning slot 68 is closer than that which exists between rod 57 and circumferentially extending slots 60, 63 and central opening 64 and in this manner aligning slot 68 in combination with tabs 45 provide an axial positioning mechanism to secure proper location of end clamps 32 relative to first and second tubular assemblies 13, 14.

Figure 11:
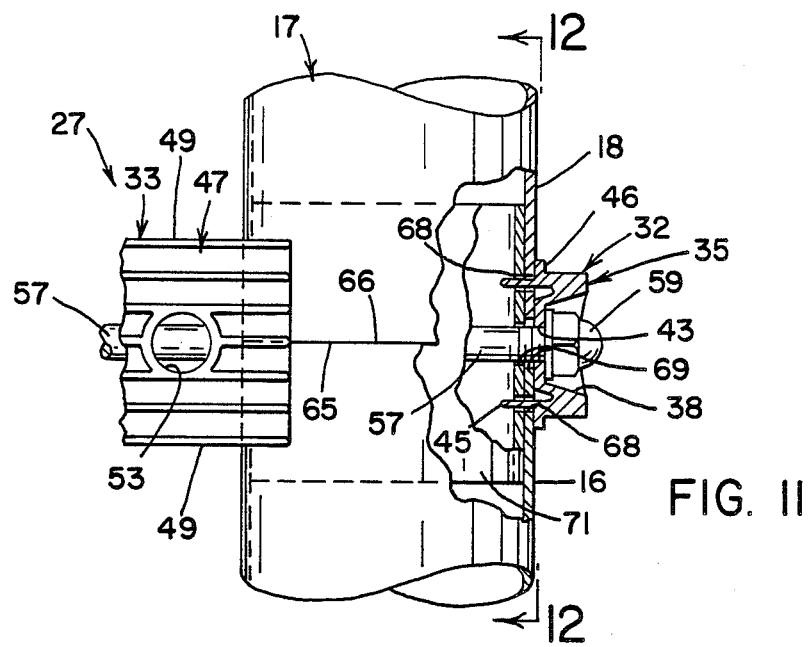
FIG. 11 is a partially sectioned top view of the clamp arrangement shown in FIG. 3 illustrating a different manner of joining the bent leg pipe end with the crossover pipe.
Figure 12:
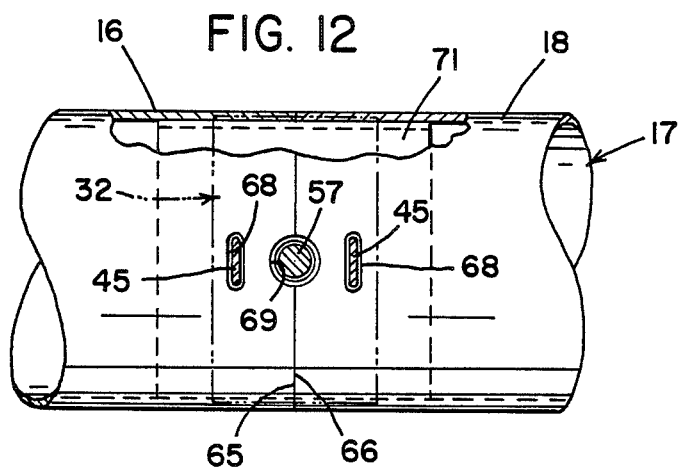
FIG. 12 is a a side view of the clamp-joint arrangement shown in FIG. 11 taken along lines 12—12 of FIG. 11.

The decorative bar arrangement 10 illustrated in FIGS. 2-6 necks down the ends of either cross-over pipe 16, 21 or the ends of leg bent ends 18, 23 and insert one within the other to form U-shaped assemblies 13, 14. Other joint connections are possible for cross-over pipe assembly 27. FIGS. 11 and 12 illustrate a butt joint connection between cross-over pipes 16, 21 and leg bent ends 18, 23 respectively and like numbers will designate like parts where applicable. In the embodiment of FIGS. 11 and 12 the radially extended slots 60 are only partially formed in the outer edge of kicker leg pipe bent end 18 and outer edge 62 of kicker cross-over pipe 16 (not shown) so that when the two edges are butted together the circumferentially extending slot 60 will be joined. Similarly, indentations are formed in the outer edge 65 of upright leg pipe bent end 18 and outer edge 66 of upright cross-over pipe 16 so that when the cross-over and bent end pipes are butted against one another, opening 64 will be formed. However, a circular opening 69 is formed in place of slot 63 shown in the embodiment of FIGS. 2-6 which prevents circular opening 64 from acting as a pivot point, but in practice does not seriously affect the hinge features of cross-over pipe assembly 27. It should also be noted that in the embodiment illustrated in FIGS. 11 and 12 an aligning slot 68 is provided in each pipe 16, 17, 21, 22 to insure that the pipes in fact are axially moved into abutting relationship with one another. A cylindrical, tubular inner bracing member 71 is then used with the arrangement disclosed to provide a double wall joint increasing the rigidity of the tubular arrangement when clamped by cross-over clamp assembly 27. Inner bracing member 71 is formed with circumferentially extending slot 60 and a pair of aligning slots 68 when inserted inside of kicker cross-over pipe 21 and bent end 23 of kicker leg pipe 22 (not shown). Similarly, inner tubular bracing member 71 is provided with circular opening 69 and circular opening 64 along with a pair of aligning slots 68 when inserted into upright cross-over pipe 16 and bent end 18 of upright leg pipe 17. For aligning purposes, openings 64, 69 are slightly smaller in tubular bracing member 71 than that formed by the indentation in the pipes. For ease of installation, inner tubular bracing member 71 could be slitted along its entire length (not shown). Inner tubular bracing member 71 could then be clasped and its O.D. reduced to insert into one of the pipes with the ring stress expanding the O.D. of inner tubular bracing member 71 against the I.D. of the abutting pipes to assure a tight connection therebetween and the axial alignment of bracing member 71 relative to the abutting cross-over and leg pipe ends can be precisely affected by means of a screwdriver positioned, say, into aligning slot 68. The embodiment illustrated in FIGS. 11 and 12 provides a double walled joint which is better able to resist deformation or crushing when threaded rod 57 is tightened than perhaps, the arrangement illustrated in FIGS. 2-6.

Figure 13:
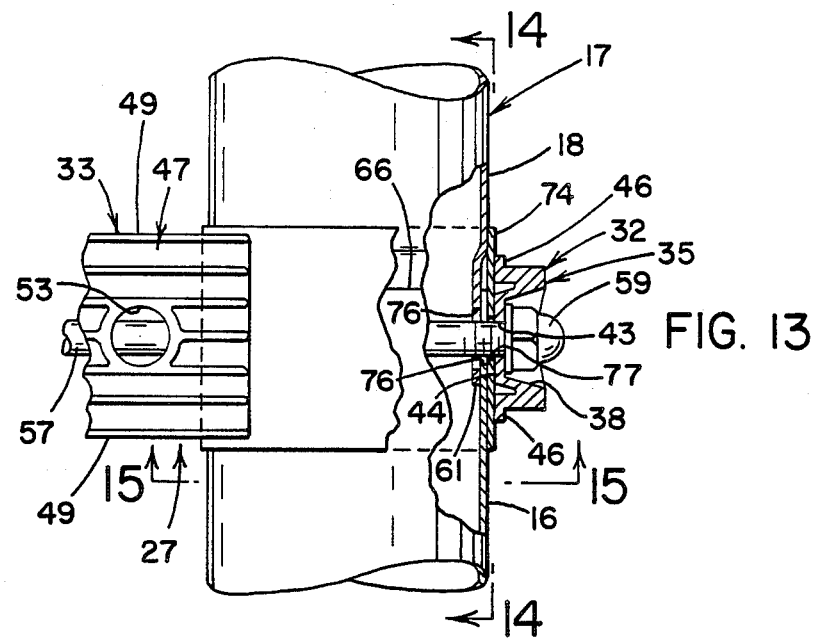
FIG. 13 is a view similar to FIG. 11 but showing the preferred clamp-joint arrangement of the invention.
Figure 14:
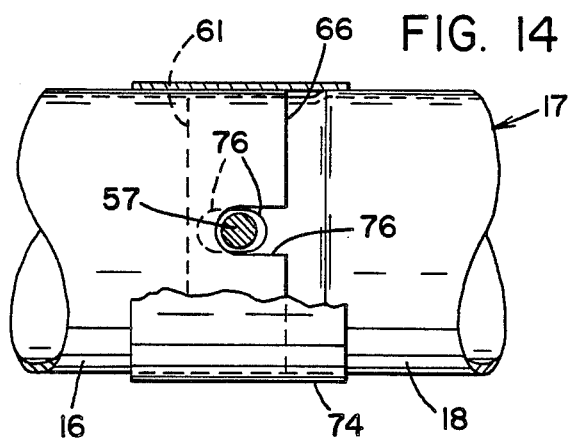
FIGS. 14 and 15 are partially sectioned views of the preferred clamp-joint arrangement shown in FIG. 13 taken, respectively, along lines 14—14 and 15—15 of FIG. 13.
Figure 15:
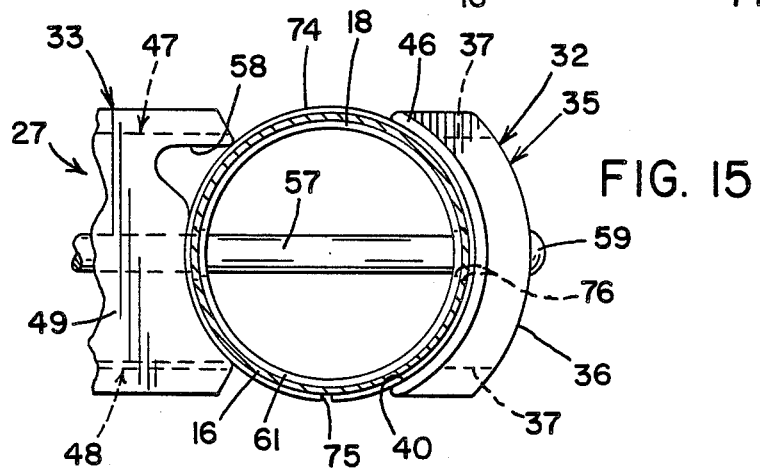

The preferred joint connection, however, is illustrated in FIGS. 13-15. In the preferred embodiment, the bent end 18 or 23 is necked down to fit within cross-over pipe 16 or 21 (or vice-versa) and is similar to that already described with reference to FIGS. 2-6 and like numbers will designate like parts where applicable. In addition, an outer tubular brace member 74 is provided which extends over the O.D. of the cross-over pipe 16 or 21 and over the O.D. of leg pipe end 18 or 21. Outer tubular support member 74 is slitted along its longitudinal length as shown at 75 so that its inside diameter can be expanded as it is axially positioned relative to cross-over pipe 16 or 21 or leg pipes 17 or 22 yet tightly grip such pipes in its relaxed state. When the outer tubular brace member 74 is applied to upright cross-over pipe 16 and upright bent leg end 18, circumferentially extending slot 63 is replaced by simply a slotted groove 76 which is formed as an indentation in edge opening 62 of cross-over pipe 16 and becomes a slotted opening 76 in leg bent end 18 not extending to edge opening 61. Slotted groove 76 does not significantly extend in the circumferential direction and overlying slotted grooves 76 is a circular opening 77 in outer brace member 74 (as well as a circular opening in the diametrically opposite position which is not shown). The outer tubular support member 74 which fits over kicker cross-over pipe 21 and kicker bent end 23 is radially slotted to form circumferentially extending slots 60 similar to that formed in the kicker pipe bent end 23 so that rotation can occur. With this arrangement, tabs 45 are eliminated because the openings in outer tubular support member 74 provide the alignment features. Rotation of kicker bent end 23 relative to kicker cross-over pipe 21 still occurs but the pivoting arrangement of rod 57 relative to upright first U-shaped tubular assembly 13 as described for the embodiment in FIGS. 2-6 does not occur because of the elimination of circumferentially extending slot 63. Optionally, first U-shaped tubular assembly 13 can be slotted to provide a circumferentially extending slot 63 to attain such additional pivoting action. The clear advantage obtained in the preferred embodiment results from the fact that end clamps 32 and center clamp 33 will engage the pipes at positions where the pipe joints are at least two times the wall thickness and for a good portion of the bearing area three times the wall thickness of a single tubular member. As noted, this permits decorative bar arrangement 10 to be constructed of thinner wall tubing which does not deform when clamped than would otherwise be necessary significantly reducing the cost of the arrangement.

FIGS. 7 and 8 illustrate an upright leg clamp assembly 28 for the first upright tubular assembly 13 while FIGS. 9 and 10 illustrate a kicker leg clamp assembly 29 for the second kicker tubular assembly 14, but in fact, both leg clamps 28, 29 are alternative variations of one another and with appropriate modifications could be substituted for one another.

Referring now to FIGS. 7 and 8, the bed end 19 of upright leg pipe 17 has a spherically configured open end 80. The spherical end 80 nests within a hollow anchor casting 82 having a spherically shaped receiving wall 84 seated against the outside surface of leg pipe end 18 and a generally flat base 85 which rests on bed 12 of the vehicle. For upright leg pipe 17 spherical shaped receiving wall 84 is welded as at 86 by resistance welding (or otherwise fixed) to spherical end 80 thus locking casting 82 to the bed end 19 of upright leg pipe 17. (If casting 82 were to be used for kicker leg pipe 22, there would not be any welding.) Positioned within spherical end 80 is an anchor member 88 having spherically shaped end surfaces 89 which seat against the inside surface of spherical end 80 so that the spherical end 80 is sandwiched and compressed between anchor member 88 and anchor casting 82. Optionally, anchor member 82, 88 could be pinned (not shown) to bent end 18. Within anchor member 88 is a blind threaded opening 90 adapted to receive a threaded fastener 91 applied from the underside of bed 12. For upright leg clamp assembly 28 a relatively large cylindrical opening 93 is provided in base 85 and an offset strap 94 spans opening 93, offsets strap 94 in turn having an opening 95 through which threaded fastener 91 passes. A bed opening 96 for fastener 91 is drilled in bed 12 and base 85 positioned over bed opening 96. The fastener 91 is then threaded into blind opening 90 and a lock or a jam nut 97 is threaded onto fastener 91 beneath offset strap 94. A large spacer washer 98 sufficient to circumscribe a portion of base 85 engages the underside surface of bed 12 and fastener 91 is appropriately tightened as by nut 99 and locked by jam nut 97 to securely fasten upright leg pipe 17 to bed 12.

The kicker leg clamp assembly 29 shown in FIGS. 9 and 10 is somewhat similar to the upright leg clamp assembly 28 described. The bed end 24 is similarly formed as a spherical end 101 into which anchor member 88 is similarly disposed. However, the kicker anchor casting 102 shown in FIGS. 9 and 10 (which may be plastic) has a semi-spherical support wall 103 with a central opening 104 which is spaced from the base 106 of kicker anchor casting 102. A threaded fastener 91 is similarly inserted into a blind opening 93 with provisions for a jam nut 97, a spacer washer 98 and a tightening nut 99 as used for upright leg clamp assembly 28. However, spherical end 101 can freely pivot relative to semi-spherical support wall 103 to allow kicker leg pipes 22 to assume their proper angular relationship relative to first decorative bar assembly 13. Importantly, when the nut 99 is tightened, the tightening force is distributed between anchor member 88 and semi-spherical support wall 103 to clamp at least a portion of spherical end 101 therebetween and thus make a rigid joint out of kicker leg clamp assembly 29. This rigidity is generally not present in the prior art devices such as that disclosed in U.S. Pat. No. 3,561,816 to Koch. However, the swivelling freedom inherent in kicker leg clamp assembly 29 permits a common length kicker leg pipe 22 to be easily applied to a variety of truck beds having different wheel well configurations than that which is otherwise possible. This, in turn, reduces the number of kicker leg pipes 22 that a supplier would otherwise have to maintain in inventory, etc.

Figure 16:
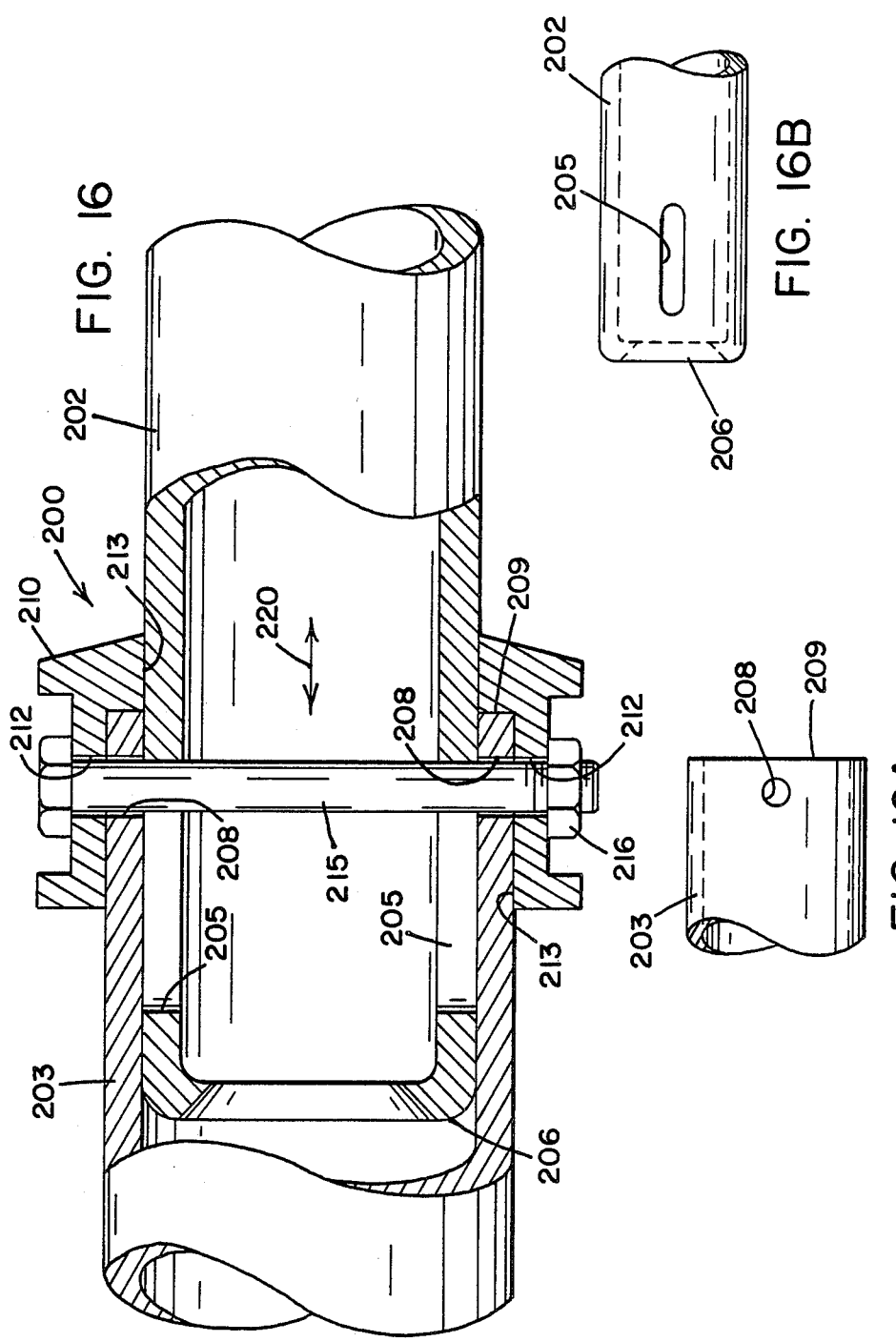
FIG. 16 is a schematic, longitudinally sectioned view of an optional telescoping clamp assembly permitting lengthwise adjustment of a decorative bar with FIGS. 16A and 16B showing two parts of the bar rotated 90° from the view illustrated in FIG. 16.

Referring next to FIGS. 16, 16A and 16B there is shown an optional frictional telescoping clamp assembly 200 which can be utilized with upright leg pipe 17, kicker leg pipe 22 or cross over pipe 16, individually or collectively, to infinitely vary, over a limited dimension, i.e. 2 inches, the length of any of the pipes. For explanatory purposes, frictional telescoping clamp assembly 200 will be described with reference to kicker leg pipe 22, it being understood that the description likewise applies to the other pipes. Kicker leg pipe 22 is now made up, in the optional embodiment, of a bent end pipe 202 and a bed end pipe 203 corresponding in function to bent end and leg end portions 23, 24 respectively of kicker leg pipe 22 heretofore described. Alternatively, for the embodiment disclosed in FIG. 16, bent end pipe 202 could be an insert pipe fitting between bent end pipes 202 and bed end pipe 203 to define a three-piece kicker leg pipe 22. In such three-piece kicker pipe arrangement there would be two frictional telescoping clamp assemblies 200. Bent end pipe 202 has a pair of diametrically opposed longitudinally extending slots 205 extending therethrough adjacent the end 206 of bent end pipe 202. Bed end pipe 203 has a pair of diametrically opposed circular openings 208 extending therethrough adjacent the end 209 of bed end pipe 203. The outside diameter of bent end pipe 202 adjacent slot 205 is sized to fit within bed end pipe 203 adjacent its end 209 so that the pipe carrying circular holes 208 circumferentially overlies the pipe carrying slots 205. Overlying bed end pipe 203 is a friction, generally annular clamp 210. Clamp 210 has provisions (not shown) to allow itself to be distended radially inwardly for frictional engagement in a locked position or expanded radially outwardly for initial application to kicker leg pipe 22. This can be accomplished by slitting clamp 210 with a longitudinally extending slot similar to that shown for tubular brace member 74 or alternatively forming clamp 210 with circumferentially extending slots similar to that used for automotive hose applications or even to form clamp 210 of a semi-rigid, resiliently pliable material which can be distended radially inwardly upon application of a tightening force. Frictional clamp 210 has a pair of diametrically opposed circular openings 212 similar to openings 208 formed in bed end pipe 203 and openings 212 are aligned with openings 208 when telescoping clamp assembly 200 is assembled. Friction clamp 210 also has a radially inwardly extending base surface 213. In the embodiment shown in FIG. 16, base surface 213 is formed to engage both the outside surfaces of bent end pipe 202 and bed end pipe 203. Finally, a fastener member 215 extends through openings 212, 208, and slots 205 for tightening frictional clamp 210 against bent end pipe 202 and bed end pipe 203. Fastener 215 is shown in FIG. 16 as a bolt with a threaded end for receiving a nut 216 to provide the desired tightening although it should be clear that fastener 215 could be a stud or a threaded rod. When nut 216 is tightened, base 213 contacts the outside surfaces of bent end pipe 202 and bed end pipe 203 and the normal or compression contact force, in turn generates a frictional force preventing relative movement of bent end pipe 202 and bed end pipe 203 in a longitudinal direction indicated by arrow 220, although the embodiment disclosed in FIG. 16 is shown in a collapsed position.

Figure 17:
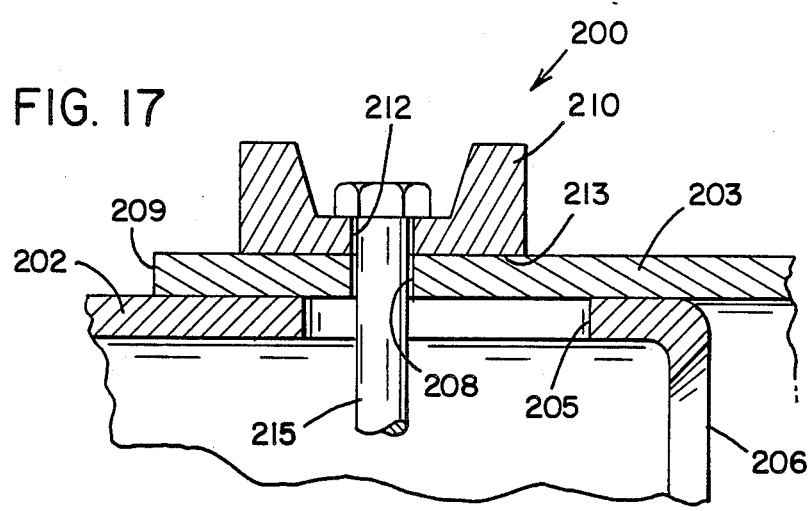
FIGS. 17 and 18 are partial, sectioned views similar to FIG. 16 showing different embodiments of the clamp illustrated in FIG. 16.
Figure 18:
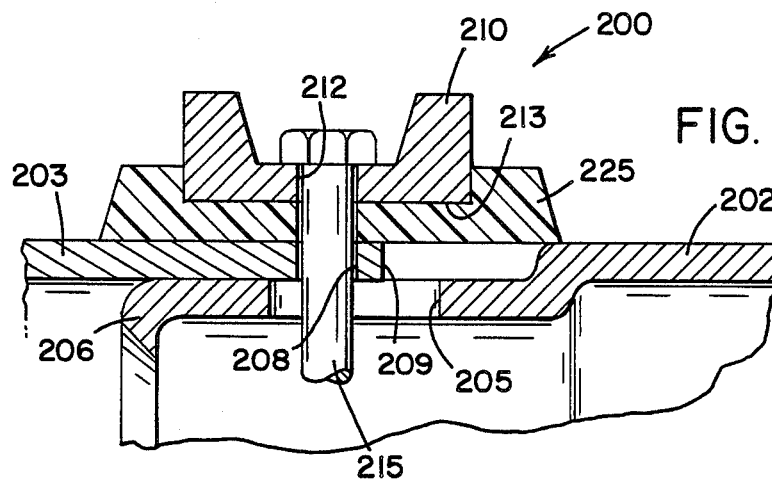

FIGS. 17 and 18 illustrate alternative embodiments of friction clamp 210 and more specifically various arrangements of friction clamp 210 applied to different bent end and bed end pipe 202, 203 arrangements and identical reference members will describe like parts where possible. In FIG. 17 bed end pipe 203 overlies slots 205 of bent end pipe 202 so that base surface 213 bears only against the outside surface of bed end pipe 203. Upon tightening nut 216 the inside surface of bed end pipe 203 is compressed against the outside surface of bent end pipe 202 which in combination with bearing surface 213 provides the desired frictional retaining force. In the embodiment disclosed in FIG. 18, bent end pipe 202 has a necked end 206 containing slots 205 similar to that described above and a decorative, preferably plastic scratch guard and slot cover 225 is interposed between base 213 of friction clamp 210 and the outside surfaces of bent end pipe 202 and bed end pipe 203, the compressive forces of fastener 215 being transmitted through cover 225 to bent and bed end pipes 202, 203.

Frictional telescoping clamp assembly 200 thus permits slight adjustments to be made to the length portions of the U-shaped assembly to insure squareness and professional installation of the decorative bar arrangement. Additionally, the number of kits to be manufactured for all pick-up truck bed installations is significantly reduced. For example, only one kit for small bed applications and one kit for large bed applications need be supplied because variations between various truck bed dimensions are compensated for by the frictional telescoping clamp assembly 200. Additionally, it should be noted that while the relative movement between the length and the shorten members is in theory controlled by a frictional engagement, the dimensioning of clamp 210 and fastener 215 is such that a very rigid, nonslipping and non-deformable joint results.

The invention has been disclosed with reference to a preferred and alternative embodiment. It is apparent that many modifications may be incorporated into the decorative bar arrangement disclosed without departing from the spirit or essence of the invention. It is my intention to include all such modifications and alterations insofar as they come within the scope of the present invention.

It is thus the essence of the invention to provide a thin walled tubular decorative bar arrangement which can be supplied in a modular kit form package for a wide variety of truck bed applications and easily installed, without the necessity of welding, by the end user.

Having thus described the invention, the following is claimed:

1. A decorative, decorative bar arrangement for installation on the bed of a pick-up truck or like vehicle to resemble a professional roll bar arrangement comprising:
    (a) a first generally upright, U-shaped tubular assembly, having a bight portion positioned generally behind and in line with the roof of the cab of said vehicle, and first and second generally parallel and vertically upstanding leg portions connected to the ends of said bight portions;
    (b) a second generally U-shaped tubular assembly having a bight portion and first and second generally parallel leg portions extending at an angular relationship relative to said first and second leg portions of said first tubular assembly said leg portions connected to the ends of said bight portion; and
    (c) hinge-fastener clamping means for securing said first assembly to said second assembly in a fixed position including pin means extending through said bight portions of said first and second tubular assemblies for fastening said bight portions in a locked parallel spaced relationship to one another in said fixed positions and swivelling means permitting rotation of said leg portions of one assembly relative to the other assembly prior to said pin means locking said bight portions together.

2. The decorative bar arrangement of claim 1 wherein said bight portions are cylindrical, said hinge-fastener means further includes at least one cross-over clamp assembly including a pair of end clamps and a middle spacing clamp, said end clamps having a center opening and an arcuate surface extending from diametrically opposite sides of said center opening; said arcuate surface of one end clamp configured to closely engage the cylindrical surface of said first bight portion about a portion thereof remote from said second bight portion; said arcuate surface of the other end clamp configured to closely engage the cylindrical surface of said second bight portion about a portion thereof remote from said first bight portion; said middle clamp having first and second oppositely opening arcuate surfaces, said first arcuate surface configured to closely engage the cylindrical surface of said first bight portion about a portion thereof adjacent said second bight portion and said second arcuate surface configured to closely engage the cylindrical surface of said second tube about a portion thereof adjacent said first bight portion; said pin means including a threaded rod extending through said opening in one of said end clamps, through said first and second bight portions, said middle clamp and at least into said opening of the opposite end clamp, and tightening means reacting with said threaded bar to draw said arcuate surfaces of said end clamps and said middle clamp into contact with said first and second bight portions whereby said bight portions are maintained in fixed, spaced alignment with one another.

3. The decorative bar arrangement of claim 2 wherein said hinge fastener means further includes diametrically opposite circumferentially extending slots of a width greater than the diameter of said rod formed in said second bight portion and extending a predetermined circumferential distance about said second bight portion; said first bight portion having at least diametrically opposed openings greater than the diameter of said rod, said threaded rod extending through said openings and said slots whereby said second bight portion is rotated relative to said first bight portion.

4. The decorative bar arrangement of claim 3 wherein said arcuate bearings surfaces are spaced away from said center opening whereby the forces of said tightening means are distsributed over said cylindrical surfaces of said bight portions irrespective of rotation thereof to prevent deformation of said bight portion.

5. The decorative bar arrangement of claim 4 wherein said bight portions of said first and second tubular assemblies comprise, respectively, first and second thin walled, cross-over pipes, said first and second leg portions of said first and second tubular members comprise, respectively, first and second thin walled, leg pipes, each leg pipe having a bed end adapted to be mounted to said bed of said pick-up truck and a bent end adapted to mate with an associated end of an associated crossover pipe, said pipe having a wall thickness of about 0.05" to 0.06".

6. The decorative bar arrangement of claim 5 wherein two cross-over clamp assemblies are provided, said arcuate surface of each end clamp positioned generally equally on one of said bent ends on associated crossover pipe, said spacing clamp having first and second walls containing said first and second arcuate surfaces, one of said walls in contact with one of said bent ends and the other wall in contact with an associated crossover pipe.

7. The decorative bar arrangement of claim 6 wherein said bent end is mated with an associated cross-over pipe by providing one of the ends of said bent end and said cross-over pipe with a smaller, reduced diameter and inserting said smaller reduced diameter end into the end of said other pipe, to provide at least a partial double walled joint, said circumferentially extending slots in said second tubular assembly formed in said reduced diameter pipe end and partially formed in said overlying pipe member, said swivelling means effective to rotate said bent end relative to said cross-over pipe.

8. The decorative bar arrangement of claim 7 wherein a cylindrical bracing member fits snugly over the joined ends of each crossover pipe and associated bent leg end to provide a triple wall joint, said bracing member for said second crossover pipe and said second bent leg end having circumferentially extending slots similar to that on said second crossover pipe and said second bent leg.

9. The decorative bar arrangement of claim 8 wherein said bracing member has an inside diameter not greater than the outside diameter of said crossover pipe and is slotted along the length thereof whereby said bracing member is radially expanded when positioned over the ends of said crossover pipe and said leg bent end.

10. The decorative bar arrangement of claim 6 wherein an associated cross-over pipe and bent end are abutted against each other and an inner tubular bracing member is inserted within said cross-over pipe and said bent end, said inner brace member for said second tubular assembly having circumferentially extending, diametrically opposed slots formed therein, said associated bent end and cross-over pipe having partially formed circumferentially extending slots overlying said slots in said inner tubular bracing member, whereby a double walled joint is formed.

11. The decorative bar arrangement of claim 2 wherein each end clamp has a first and second longitudinally extending rib, each rib having an outer wall, a radially inwardly extending outer side wall and inner side wall depending from said outer wall, said outer side wall ending at a longitudinally extending arcuate bearing wall having an inner surface defined as said arcuate bearing surface, said inner side wall of said first and second ribs terminating in a boss wall, said boss wall having said center opening formed therein.

12. The decorative bar arrangement of claim 6 wherein said boss wall has radially inwardly extending aligning tabs spaced from said center opening extending therefrom, each crossover pipe has a circumferentially extending aligning slot slightly wider than said tabs formed therein for receiving one of said tabs, each bent end has a circumferentially extending aligning slot slightly wider than said tab formed therein for receiving one of said tubes whereby the axial position of said end clamp relative to an associated bent end and crossover pipes is fixed.

13. The decorative bar arrangement of claim 1 wherein each leg portion has a spherically configured end, a dished anchoring casting similarly spherically configured for receiving said spherical end at various angles relative thereto and threaded locking means for securing said spherical end to said anchoring casting and to said bed.

14. The decorative bar arrangement of claim 13 wherein said threaded locking means includes a locking anchor member suspended within said spherical end, said anchor member having a blind, threaded bore opening to the open end of said spherical leg end, said anchoring casting having an opening therethrough aligned with said threaded bore, a threaded rod threadingly received within said bore and extending through said opening in said receiving casting and through an opening in said bed and a fastener secured to the opposite end of said threaded rod and tightened against the underside of said bed to secure said leg end to said bed.

15. The decorative bar arrangement of claim 14 wherein said receiving casting has a wall portion formed adjacent its opening and spaced from said bed through which said threaded rod passes, and a lock nut is applied to said threaded rod adjacent said wall portion for locking said threaded rod to said anchor member whereby said fastener can lock said rod to said bed.

16. The decorative bar arrangement of claim 14 wherein each spherical end of first tubular leg portion is welded to said dished casting.

17. The decorative bar arrangement of claim 15 wherein said leg portions of at least one of said U-shaped tubular assemblies comprises (i) first and second adjustable leg pipes, said first adjustable leg pipe having a pair of diametrically opposite longitudinally extending slots therethrough adjacent one end thereof and extending therethrough, said second adjustable leg pipe having two diametrically opposite circular openings extending therethrough at one end thereof, said second adjustable leg pipe circumferentially overlying said first adjustable leg pipe, and (ii) friction stamp means permitting longitudinal movement at infinite positions along the length of said in decorative bar arrangement in a loosened position, while locking, by friction, said first and second adjustable leg pipes against relative movement therebetween in a locked position.

18. The decorative bar arrangement of claim 17 wherein said friction clamp means includes an annular friction clamp circumferentially overlying said second adjustable leg pipe and having two diametrically opposite openings extending therethrough, said friction clamp having a radially inwardly extending base surface for frictionally preventing relative movement between said first and second adjustable leg pipes, and a threaded fastener extending through said openings in said friction clamp, said second adjustable leg pipe and said slots in said first adjustable leg pipe for locking said clamp and said first and second adjustable leg pipes together when tightened.

19. The decorative bar arrangement of claim 18 wherein said clamp base contacts the outer surface of said second adjustable leg pipe.

20. The decorative bar arrangement of claim 19 wherein said clamp base additionally contacts the entire surface of said first adjustable leg pipe.

21. The decorative bar arrangement of claim 18 wherein
    said first adjustable leg pipe having a necked down end containing said slots with an outside diameter less than the inside diameter of said second adjustable leg pipe, with the remainder of said first adjustable leg pipe equal in diameter to said second adjustable leg pipe;
    said friction clamp means further including an annular, slotted cover inserted between said clamp base and contacting the outer surfaces of said first and second adjustable leg pipes.

22. The decorative bar arrangement of claim 8 wherein each leg pipe has a bed end portion said bed end portion having a spherically configured end, a dished anchoring casting similarly spherically configured for receiving said spherical end at various angles relative thereto and threaded locking means for securing said spherical end to said anchoring casting and to said bed.

23. The decorative bar arrangement of claim 22 wherein said threaded locking means includes a locking anchor member suspended within said spherical end, said anchor member having a blind, threaded bore opening to the open end of said spherical leg end, said anchoring casting having an opening therethrough aligned with said threaded bore, a threaded rod threadingly received within said bore and extending through said opening in said receiving casting and through an opening in said bed and a fastener secured to the opposite end of said threaded rod and tightened against the underside of said bed to secure said leg end to said bed.

24. The decorative bar arrangement of claim 23 wherein said receiving casting has a wall portion formed adjacent its opening and spaced from said bed through which said threaded rod passes, and a lock nut is applied to said threaded rod adjacent said wall portion for locking said threaded rod to said anchor member whereby said fastener can lock said rod to said bed.

25. The decorative bar arrangement of claim 24 wherein each spherical end of first tubular leg portion is welded to said dished casting.

26. The decorative bar arrangement of claim 4 wherein said first bight portion has a circumferentially extending slot formed therein of lesser distance than that formed in said second bight portion over a portion remote from said first bight portion and said first bight portion has a circular pivot opening approximately equal to the diameter of said threaded rod diametrically opposite said first bight portion's circumferentially extending slot whereby said threaded rod may pivot relative to said first and second bight portions.

27. The decorative bar arrangement of claim 1 wherein said leg portions of at least one of said U-shaped tubular assemblies comprises (i) first and second adjustable leg pipes, said first adjustable leg pipe having a pair of diametrically opposite longitudinally extending slots therethrough adjacent one end thereof and extending therethrough, said second adjustable leg pipe having two diametrically opposite circular openings extending therethrough at one end thereof, said second adjustable leg pipe circumferentially overlying said first adjustable leg pipe, and (ii) friction stamp means permitting longitudinal movement at infinite positions along the length of said in decorative bar arrangement in a loosened position, while locking, by friction, said first and second adjustable leg pipes against relative movement therebetween in a locked position.

28. The decorative bar arrangement of claim 27 wherein said friction clamp means includes an annular friction clamp circumferentially overlying said second adjustable leg pipe and having two diametrically opposite openings extending therethrough, said friction clamp having a radially inwardly extending base surface for frictionally preventing relative movement between said first and second adjustable leg pipes, and a threaded fastener extending through said openings in said friction clamp, said second adjustable leg pipe and said slots in said first adjustable leg pipe for locking said clamp and said first and second adjustable leg pipes together when tightened.

29. The decorative bar arrangement of claim 28 wherein said clamp base contacts the outer surface of said second adjustable leg pipe.

30. The decorative bar arrangement of claim 29 wherein said clamp base additionally contacts the entire surface of said first adjustable leg pipe.

31. The decorative bar arrangement of claim 28 wherein
said first adjustable leg pipe having a necked down end containing said slots with an outside diameter less than the inside diameter of said second adjustable leg pipe, with the remainder of said first adjustable leg pipe equal in diameter to said second adjustable leg pipe;
said friction clamp means further including an annular, slotted cover inserted between said clamp base and contacting the outer surfaces of said first and second adjustable leg pipes.

32. A decorative bar kit for application to the bed of a pick-up truck or like vehicle to resemble a professionally installed roll bar arrangement comprising:
(a) a first upright U-shaped tubular assembly having a bight portion and a pair of leg portions depending from the ends of said bight portion, said first U-shaped tubular assembly including a first cross-over pipe, and a pair of first leg pipes, each first leg pipe having a bent end adapted to mate with said cross-over pipe and a bed end adapted to be secured to said bed;
(b) a second upright U-shaped tubular assembly having a bight portion and a pair of leg portions depending from the ends of said bight portion, said second U-shaped tubular assembly including a second cross-over pipe and a pair of second leg pipes, each second leg pipe having a bent end adapted to mate with said cross-over pipe and a bed end adapted to be secured to said bed;
(c) a pair of upright anchoring clamps, each clamp adapted to secure a bed end of an associated first leg bed end to said bed;
(d) a pair of kicker anchoring clamps, each clamp adapted to secure a bed end of an associated second leg bed end to said bed; and
(e) hinge-fastener clamping means for securing said first assembly to said second assembly in a fixed position including pin means extending through said bight portions of said first and second tubular assemblies for fastening said bight portions in a locked parallel spaced relationship to one another in said fixed positions and swivelling means permitting rotation of said leg portions of one assembly relative to the other assembly prior to said pin means locking said bight portions together.

33. The kit of claim 32 wherein said bight portions are cylindrical, said hinge-fastener means further includes at least one cross-over clamp assembly including a pair of end clamps and a middle spacing clamp, said end clamps having a center opening and an arcuate surface extending from diametrically opposite sides of said center opening; said arcuate surface of one end clamp configured to closely engage the cylindrical surface of said first bight portion about a portion thereof remote from said second bight portion; said arcuate surface of the other end clamp configured to closely engage the cylindrical surface of said second bight portion about a portion thereof remote from said first bight portion; said middle clamp having first and second oppositely opening arcuate surfaces, said first arcuate surface configured to closely engage the cylindrical surface of said first bight portion about a portion thereof adjacent said second bight portion and said second arcuate surface configured to closely engage the cylindrical surface of said second tube about a portion thereof adjacent said first bight portion; said pin means including a threaded rod extending through said opening in one of said end clamps, through said first and second bight portions, said middle clamp and at least into said opening of the opposite end clamp, and tightening means reacting with said threaded bar to draw said arcuate surfaces of said end clamps and said middle clamp into contact with said first and second bight portions whereby said bight portions are maintained in fixed, spaced alignment with one another.

34. The kit of claim 33 wherein said hinge fastener means further includes diametrically opposite circumferentially extending slots of a width greater than the diameter of said rod formed in said second bight portion and extending a predetermined circumferential distance about said second bight portion; said first bight portion having at least diametrically opposed openings greater than the diameter of said rod, said threaded rod extending through said openings and said slots whereby said second bight portion is rotated relative to said first bight portion.

35. The kit of claim 33 wherein said arcuate bearings surfaces are spaced away from said center opening whereby the forces of said tightening means are distributed over said cylindrical surfaces of said bight portions irrespective of rotation thereof to prevent deformation of said bight portion.

36. The kit of claim 35 wherein said first bight portion has a circumferentially extending slot formed therein of lesser distance than that formed in said second bight portion over a portion remote from said first bight portion and said first bight portion has a circular pivot opening approximately equal to the diameter of said threaded rod diametrically opposite said first bight portion's circumferentially extending slot whereby said threaded rod may pivot relative to said first and second bight portions.

37. The kit of claim 33 wherein two cross-over clamp assemblies are provided, said arcuate surface of each end clamp positioned generally equally on one of said bent ends on associated cross-over pipe, said spacing clamp having first and second walls containing said first and second arcuate surfaces, one of said walls in contact with one of said bent ends and the other wall in contact with an associated cross-over pipe.

38. The kit of claim 37 wherein said bent end is mated with an associated cross-over pipe by providing one of the ends of said bent end and said cross-over pipe with a smaller, reduced diameter and inserting said smaller reduced diameter end into the end of said other pipe, to provide at least a partial double walled joint, said circumferentially extending slots in said second tubular assembly formed in said reduced diameter pipe end and partially formed in said overlying pipe member, said swivelling means effective to rotate said bent end relative to said cross-over pipe.

39. The kit of claim 38 wherein a cylindrical bracing member fits snugly over the joined ends of each cross-over pipe and associated bent leg end to provide a triple wall joint, said bracing member for said second cross-over pipe and said second bent leg end having circumferentially extending slots similar to that on said second crossover pipe and said second bent leg.

40. The kit of claim 39 wherein said bracing member has an inside diameter not greater than the outside diameter of said crossover pipe and is slotted along the length thereof whereby said bracing member is radially expanded when positioned over the ends of said crossover pipe and said leg bent end.

41. The kit of claim 32 wherein each leg portion has a spherically configured end, a dished anchoring casting similarly spherically configured for receiving said spherical end at various angles relative thereto and threaded locking means for securing said spherical end to said anchoring casting and to said bed.

42. The kit of claim 41 wherein said threaded locking means includes a locking anchor member suspended within said spherical end, said anchor member having a blind, threaded bore opening to the open end of said spherical leg end, said anchoring casting having an opening therethrough aligned with said threaded bore, a threaded rod threadingly received within said bore and extending through said opening in said receiving casting and through an opening in said bed and a fastener secured to the opposite end of said threaded rod and tightened against the underside of said bed to secure said leg end to said bed.

43. The kit of claim 42 wherein said receiving casting has a wall portion formed adjacent its opening and spaced from said bed through which said threaded rod passes, and a lock nut is applied to said threaded rod adjacent said wall portion for locking said threaded rod to said anchor member whereby said fastener can lock said rod to said bed.

44. The kit of claim 43 wherein each spherical end of first tubular leg portion is welded to said dished casting.

45. The kit of claim 32 wherein said leg portions of at least one of said U-shaped tubular assemblies comprises (i) first and second adjustable leg pipes, said first adjustable leg pipe having a pair of diametrically opposite longitudinally extending slots therethrough adjacent one end thereof and extending therethrough, said second adjustable leg pipe having two diametrically opposite circular openings extending therethrough at one end thereof, said second adjustable leg pipe circumferentially overlying said first adjustable leg pipe, and (ii) friction stamp means permitting longitudinal movement at infinite positions along the length of said in decorative bar arrangement in a loosened position, while locking, by friction, said first and second adjustable leg pipes against relative movement therebetween in a locked position.

46. The decorative bar arrangement of claim 45 wherein said friction clamp means includes an annular friction clamp circumferentially overlying said second adjustable leg pipe and having two diametrically opposite openings extending therethrough, said friction clamp having a radially inwardly extending base surface for frictionally preventing relative movement between said first and second adjustable leg pipes, and a threaded fastener extending through said openings in said friction clamp, said second adjustable leg pipe and said slots in said first adjustable leg pipe for locking said clamp and said first and second adjustable leg pipes together when tightened.

47. The decorative bar arrangement of claim 46 wherein said clamp base contacts the outer surface of said second adjustable leg pipe.

48. The decorative bar arrangement of claim 47 wherein said clamp base additionally contacts the entire surface of said first adjustable leg pipe.

49. The decorative bar arrangement of claim 46 wherein
said first adjustable leg pipe having a necked down end containing said slots with an outside diameter less than the inside diameter of said second adjustable leg pipe, with the remainder of said first adjustable leg pipe equal in diameter to said second adjustable leg pipe;
said friction clamp means further including an annular, slotted cover inserted between said clamp base and contacting the outer surfaces of said first and second adjustable leg pipes.

* * * * *